United States Patent
Dollendorf et al.

(10) Patent No.: US 11,041,037 B2
(45) Date of Patent: Jun. 22, 2021

(54) ULTRA VIOLET ASSISTED PHOTO INITIATED FREE RADICAL POLYMERIZATION

(71) Applicant: SOLENIS TECHNOLOGIES, L.P., Wilmington, DE (US)

(72) Inventors: Christian Dollendorf, Wilmington, DE (US); Markus Broecher, Wilmington, DE (US); Patric Bierganns, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 183 days.

(21) Appl. No.: 16/148,010

(22) Filed: Oct. 1, 2018

(65) Prior Publication Data

US 2020/0102414 A1    Apr. 2, 2020

(51) Int. Cl.
*C08F 220/36* (2006.01)

(52) U.S. Cl.
CPC ........ *C08F 220/36* (2013.01); *C08F 2800/20* (2013.01)

(58) Field of Classification Search
CPC .. C08F 220/36; C08F 2800/20; C08F 220/34; C08F 220/56; C08F 2/32; C08F 2/48
See application file for complete search history.

(56) References Cited

U.S. PATENT DOCUMENTS

| | | | |
|---|---|---|---|
| 3,558,309 A | 1/1971 | Laridon et al. | |
| 7,615,258 B2 | 11/2009 | Naylor et al. | |
| 2011/0172314 A1 | 7/2011 | Findlay et al. | |
| 2016/0159939 A1* | 6/2016 | Hesse | B01J 19/10 428/402 |

FOREIGN PATENT DOCUMENTS

CN    101550202 B    9/2011

OTHER PUBLICATIONS

Allcock, et al., "Contemporary Polymer Chemistry", (Englewood Cliffs, N.J., Prentice-Hall, 1981), chapters 3-5.
ISA/US, International Search Report and Written Opinion issued in Int. Appl. No. PCT/US2019/053955 dated Nov. 29, 2019.

* cited by examiner

*Primary Examiner* — Jessica M Roswell
(74) *Attorney, Agent, or Firm* — Lorenz & Kopf, LLP (57) ABSTRACT

A method of producing a polymerized product through an inverse emulsion polymerization reaction. The current method includes introducing an ultraviolet (UV) light sensitive initiator into an inverse emulsion monomer formulation comprising monomers and irradiating the monomer formulation with an UV light source. A polymerized product is formed from polymerization of the monomers in the presence of the irradiated UV light sensitive initiator.

17 Claims, 5 Drawing Sheets

ULTRA VIOLET ASSISTED PHOTO INITIATED FREE RADICAL POLYMERIZATION

TECHNICAL FIELD

The present disclosure pertains to an improved polymerization process for the isothermal production of nonionic, anionic and cationic acrylamide based inverse emulsion homo- and copolymers due to ultraviolet (UV) assisted photoinitiated free radical polymerization.

BACKGROUND

In an inverse emulsion polymerization, a hydrophilic monomer, frequently in aqueous solution, is emulsified in a continuous oil phase using a water-in-oil emulsifier and polymerized using either an oil-soluble or water-soluble initiator; the products are viscous lattices comprised of submicroscopic, water-swollen, hydrophilic polymer particles colloidally suspended in the continuous oil phase. The technique is applicable to a wide variety of hydrophilic monomers and oil media.

Polymerization of the inverse emulsion may be carried out in any manner known to those skilled in the art. Examples can be found in many references, including, for example, Allcock and Lampe, Contemporary Polymer Chemistry, (Englewood Cliffs, N.J., PRENTICE-HALL, 1981), chapters 3-5.

Inverse emulsion polymerization is a standard chemical process for preparing high molecular weight water-soluble polymers or copolymers. In general, an inverse emulsion polymerization process is conducted by 1) preparing an aqueous solution of the monomers, 2) contacting the aqueous solution with a hydrocarbon liquid containing appropriate emulsification surfactant(s) or surfactant mixture to form an inverse monomer emulsion, 3) subjecting the monomer emulsion to free radical polymerization, and, optionally, 4) adding a breaker surfactant to enhance the inversion of the emulsion when added to water. Other forms of inverse emulsion polymerization use solid emulsifiers that have been melted before use and the emulsifiers are added into the oil phase rather than the water phase.

Inverse emulsions polymers are typically water-soluble polymers based upon ionic or non-ionic monomers. Polymers containing two or more monomers, also referred to as copolymers, can be prepared by the same process. These co-monomers can be anionic, cationic, zwitterionic, non-ionic, or a combination thereof.

Inverse emulsion polymerization is a type of radical polymerization that usually starts with a water phase incorporating water, monomer, and surfactant, emulsified into a continuous oil phase. The most common type of inverse emulsion polymerization is a water in oil emulsion, in which water and monomer droplets are emulsified, with surfactants in a continuous phase of oil. Water-soluble polymers, such as certain polyvinyl alcohols or hydroxyethyl celluloses, can also be used to act as emulsifiers/stabilizers. Inverse emulsion polymerization is used to manufacture several commercially important polymers, where the dispersion itself is the end product.

It is known to produce water soluble and water swellable polymers using a variety of initiator systems. Initiators are often used in chain-growth polymerization such as radical polymerization to regulate initiation by heat or light. For instance, it is common practice to polymerize water soluble monomers using redox initiator couples, in which radicals are generated by admixing with the monomer a redox couple which is a reducing agent and an oxidizing agent.

It is conventional practice to use initiators in the reaction process, either alone or in combination with other initiator systems, initiators such as thermal initiators, which would include any suitable initiator compound that releases radicals at an elevated temperature. Other initiator system based on other concepts include redox pair systems or photo induced initiator decomposition at specific wavelengths.

Thermal polymerization initiators are compounds that generate radicals or cations upon exposure to heat. For example, azo compounds such as 2,2'-azobis(isobutyronitrile) (AIBN) and organic peroxides such as benzoyl peroxide (BPO) are well-known thermal radical initiators, and benzenesulfonic acid esters and alkylsulfonium salts have been developed as thermal cation initiators.

In the thermal process, residual monomers must be treated either with higher temperature or longer reaction time. In the thermal process, initiator decomposition is triggered at a certain temperature. Therefore, the emulsion must be heated up to start the reaction. Later, the emulsion is treated at even higher temperatures to trigger more initiator decomposition and lower residual monomers. Another method is to add a redox or other type of initiator at the end of the polymerization to lower residual monomer amounts.

With the thermal process, after nearly completed polymerization, the standard thermal process needs additional time at higher temperature to reduce residual monomers. From this higher temperature, the emulsion must be cooled down via a distillation process. These steps are very time consuming.

Efforts have been made to speed the polymerization process and/or reduce unreacted monomer, with limited success. Some of these efforts have been through the use of various thermal initiators, such as, 2,2'-azobis[2-(2-imidazoline-2-yl)propane] dihydrochloride, benzoyl peroxide, tert-butyl hydroperoxide, cumene hydroperoxide, di-tert-butyl peroxide, and dicumyl peroxide and thermal cationic polymerization initiators, such as, benzyl(4-hydroxyphenyl) methylsulfonium hexafluoroantimonate, dicyandiamide, cyclohexyl p-toluenesulfonate, diphenyl(methyl)sulfonium tetrafluoroborate, and (4-hydroxyphenyl)methyl (2-methylbenzyl)sulfonium hexafluoroantimonate.

Photo-polymerization initiators are roughly categorized into three groups depending on the generated active species (radicals, cations, anions). Conventional photopolymerization initiators such as benzoin derivatives generate free radicals upon light irradiation. Photo-acid generators which produce cations (acid) upon light irradiation found practical use in the late 1990s. Photo-base generators, which produce anions (base) upon light irradiation, are being investigated for use in practical applications.

Therefore, process improvements, such as, faster batch production with reduced residual monomers in the final product is always the goal.

BREIF SUMMARY

The present disclosure is directed to a method of producing a polymerized product through an inverse emulsion polymerization reaction. The method comprises introducing an ultraviolet (UV) light sensitive initiator into an inverse emulsion monomer formulation comprising monomers, irradiating the monomer formulation with an ultraviolet light source, wherein the polymerized is formed from polymerization of the monomers in the presence of the irradiated UV light sensitive initiator. The process is completed when the produced polymer meets the individual product specification, including, for example molecular weight, performance, and low residual monomer amount and forming a polymerized product.

BRIEF DESCRIPTION OF THE DRAWINGS

The present disclosure will hereinafter be described in conjunction with the following drawing figures.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description.

The disclosure relates to a method of improving an inverse emulsion polymerization reaction through the introduction of an ultraviolet (UV) light sensitive initiator into an inverse emulsion monomer formulation and irradiating the monomer formulation with an ultraviolet light source, thus forming a polymerized product.

With constant light irradiation during the whole reaction, there is no need to let the emulsion get to higher temperature for lower residuals, and thus no need to distill from this higher temperature to room temperature.

Surprisingly, it was found during an inverse polymerization reaction, that using an UV only initiator gave better control of the reaction. Usually, thermal initiator decomposition occurs at a certain temperature and at a certain rate. At higher temperatures, decomposition rates increase. More decomposed initiator means more starting polymer chains, resulting in more exothermic polymer chain growth. This results in more heat being generated and more initiator decomposition compared with lower temperatures.

It was also found that compared to the standard thermal induced inverse emulsion polymerization process, the production of nonionic, anionic and cationic acrylamide-based homo- and copolymers can be improved by using an ultraviolet (UV) assisted free radical polymerization technique, in a way to reduce production time without negative effects on characteristics, residual monomers or performance.

In the current method, the generated heat is controlled via distillation. It was found that if a UV-only initiator is used in the inverse emulsion polymerization reaction, increased temperature due to starting polymer chain growth does not lead to more initiator decomposition. Therefore, the heat of reaction and the polymerization reaction itself can also be controlled via UV light source intensity.

It was also found that a higher light intensity at the end of the reaction leads to more initiator decomposition, which means less residual monomers and vice versa, i.e. higher intensity at the beginning with low amounts of initiator means still a starting polymerization. For example, turning off the UV light leads to no additional initiator decomposition. Therefore, the polymerization reaction can be controlled with UV light intensity and/or distillation. This makes the polymerization reaction much more controllable resulting in shorter production times.

Without the use or need for a thermal initiator, the inverse emulsion polymerization reaction can be initiated at lower temperatures and the temperature during the reaction does not have to be held at a strictly defined temperature. This can bring additional time savings.

The monomer formulations can be any such formulations used in inverse emulsion polymerization reactions. Nonionic monomers having a reduced solubility in aqueous solutions can be used in the preparation of the associative polymer. Examples include alkylacryamides; ethylenically unsaturated monomers that have pendant aromatic and alkyl groups; ethers, such as, ethyleneoxide, propylene oxide and butylene oxide; and vinylalkoxylates; ally; alkoxylates; and ally phenyl polyol ether sulfates. Exemplary materials include, but are not limited to, methylmethacrylate, styrene, t-octyl acrylamide, and allyl phenyl polyol ether sulfate marketed by Clariant as Emulsogen™ APG 2019.

Anionic monomers include free acids and salts of, for example, acrylic acid; methacrylic acid; maleic acid; itaconic acid; acrylamidoglycolic acid; 2-acry-lamido-2-methyl-1-propanesulfonic acid; 3-allyloxy-2-hydroxy-1-propanesulfonic acid; styrenesulfonic acid; vinyl-sulfonic acid; vinylphosphonic acid; and 2-acrylamido-2-methylpropane phosphonic acid.

Cationic monomers include, for example, cationic ethylenically unsaturated monomers such as the free base or salt of diallyldialkylammonium halides, such as diallyldimethylammonium chloride; (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth) acrylamides, such as N,N-dimethylaminoethylacrylamide, and the salts and quaternaries thereof.

Non-ionic monomers, include for example, acrylamide; methacrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinyl formamide; N-vinyl methyl formamide; vinyl acetate; N-vinyl pyrrolidone; hydroxyalky(meth)acrylates such as hydroxyethyl (meth)acrylate and hydroxypropyl(meth)acrylate.

The co-monomers may be present in any ratio. The resultant associative polymer can be non-ionic, cationic, anionic, or amphoteric (contains both cationic and anionic charge).

In some aspects of the current method, the UV light sensitive initiator is sensitive only to UV light. However, additional initiators such as redox initiators, thermal initiators, photo initiators, or a combination thereof can be optionally added to the inverse emulsion monomer formulation.

In some aspects of the current method, the UV light sensitive initiator can be an azo compound having the functional group R—N=N—$R^1$ wherein R and $R^1$ can be and aryl or alkyl group, azobi si sobutyronitrile, 2,2'-azobis

[2-(2-imidazolin-2-yl)propane]dihydrochloride (VA-044), 2,2'-azobis(2,4-dimethylvaleronitrile) (V-65), benzoyl peroxide, 2,2-dimethoxy-2-phenylacetophenone (DMPA), 2,4,6-trimethylbenzoylphenyl phosphinate (Irgacure® TPO-L) or any other photosensitive initiators and combinations thereof.

In other aspects of the current method, the UV light sensitive initiator has an absorption band width of from about 280 nanometer (nm) to about 420 nm, can be from about 320 nm to about 400 nm, and may be 365 nm. In preferred methods the ultraviolet light sensitive initiator shows an absorption at 365 nm. But, as polymerization processes, initiators, and light sources change, it is envisioned the method could be expanded outside of these ranges.

Ultraviolet only initiators sensitive to the UV-LED light emission at 365 nm are generally water insoluble and relatively easy to find. Initiators with other absorption maxima are harder to find and, in most cases, more expensive.

In some aspect of the current method, the UV light source can be a tube, lance or any other geometry. The light source can also be a fluorescent lamp, mercury-vapor lamp or any other type of UV light emitting source, such as an LED light source, or can be a combination thereof.

Additionally, the use of LED's as a UV light source can provide more energy to start the reaction, have a longer lifetime than many other light sources, need less space for implementation, and can be adjusted to other wavelengths to work in other polymerization processes if necessary.

In some aspects of the current method, the UV light can be applied to the emulsion. For example, a glass lance with added high intensity LED at the end of the lance could be placed directly into the emulsion, or the UV source can be placed outside the glass reactor, or a combination thereof.

There are several determining factors, with respect to the intensity of the UV light source, that is needed to initiate and complete the polymerization reaction. For example, throughout the reaction, the light intensity will change because the opacity of the emulsion changes and some formulations and reactions are more turbid than others requiring higher irradiation intensities.

In some aspects of the present method, the intensity of the UV light source can be 0.15 mW/cm$^2$ or higher and can be 20 mW/cm$^2$ or higher. In addition, the intensity of the light source can be changed at any point throughout the reaction.

Surprisingly, it was found that it was the intensity of the UV light source that drives the reaction and not the amount of initiator. The intensity of the UV light source seems more important than the amount of initiator. For example, the polymerization reaction can be initiated using lower initiator amounts. In contrast, higher amounts of initiator are required when using lower intensity light sources and may result in longer reaction times.

In some aspects of the current method, the initial temperature of the inverse emulsion reaction can be from about 0° C. to about 100° C., can be from about 20° C. to about 80° C., and may be from about 30° C. and about 50° C. Depending on the type of process and initiators used, the polymerization is carried out until a recognizable drop in distillate and/or temperature takes place.

The current method provides for faster production time, less distillation, and better reaction control. In addition, because the initiator is just UV sensitive, there is no thermal decomposition of initiator, since the reaction can be run at lower temperatures, thus providing for not only a faster reaction, but also a safer reaction.

The following examples are provided to illustrate some aspects of the polymerization process

EXAMPLES

When comparing standard thermally induced inverse emulsion polymerization reactions to the current ultraviolet induced inverse emulsion polymerization reaction, the UV induced procedure ensures time savings due to process improvement. These improvements are a result of not needing additional reaction time at elevated temperature to induce more initiator decomposition and thus reduce residual monomer amounts. The standard thermal polymerization process uses distillation to keep temperature and thus initiator decomposition and polymerization at a constant rate. Usually, after nearly completed reaction the polymer emulsion was allowed to reach higher temperature by stopping stirring and setting up ambient pressure. The initiator decomposition and polymerization energy cause the temperature of the emulsion to increase, leading to more initiator decomposition, which reduces residual monomers. At a certain temperature ("Tmax"), no further temperature increase can be observed, and distillation was used to get to a temperature to finish the batch production.

While using a thermal and/or only UV sensitive initiator, a constant UV irradiation during the polymerization and distillation to lower temperature to about 40° C. for batch completion ensures same or less residual monomers, while maintaining the same product specification and performance.

Tables 1-5 and representative FIGS. 1-5, show the time savings of thermally produced polymer compared with the current UV process, using only a UV sensitive initiator. As can be seen in FIG. 1 to FIG. 5, there are time savings of between 20 to 90 minutes depending on the specific polymer formulation and product specific "Tmax" temperature.

It was also found, that with higher UV light source intensity at the end of the reaction and distillation, the residual monomer amounts are in a lower range compared to the standard thermal process, even with lower initiator amounts.

The following UV light induced polymerization examples use a 4-diode source, with DMPA as the only initiator in equal or lower amounts on molar bases compared to the standard used thermal initiator.

Example 1—Cationic Acrylic Acid Derivate Polyelectrolyte Using Thermal Initiator An inverse emulsion was prepared using a water phase comprises 267.7 grams of 43% aqueous acrylamide solution, 0.2 grams of Trilon®C (10% solution, diethylenetriaminepentaacetic acid), 110.5 grams of soft water, 430.8 g of 80% (2-acryloyloxy-ethyl)-trimethylammonium chloride (ADAME-Quat) solution and 0.14 g of 20% solution of formic acid. A pH of 3.02 was adjusted using 2.3 grams of a 50% solution of sulfuric acid under constant stirring.

The oil phase was prepared by dissolving 18 grams Lumisorb™SMO (sorbitan monooleate surfactant), 13.1 grams Genapol™LA070S (ethoxylated fatty alcohol surfactant) and 8 grams Rohamere™3059 L (polymeric surfactant) into 254.9 grams of Shellsol™D80 (aliphatic mineral oil) and 0.025 grams of 2,2'-azobis(2,4-dimethylvaleronitrile) (V-65) was added under continuous stirring.

The emulsion was prepared by dissolving the water phase into the oil phase using a homogenizer to obtain a stable water-in-oil emulsion.

After transfer into a polymerization reactor including a thermometer, anchor stirrer, septum and distillation bridge with attached vacuum pump and oxygen was removed via vacuum for 30 minutes.

The emulsion was heated to 56° C. and kept at 53-56° C. under constant stirring.

After collecting 95 mL of distillate, the stirring was stopped, and the vacuum was set to ambient pressure under nitrogen conditions.

After the temperature reached a plateau, the emulsion was cooled down via distillation under continuous stirring to a temperature of 40° C. at which time 5 grams of sodium peroxodisulfate solution (25 wt. % in water) and 9.4 grams of a sodium metabisulfite solution (25 wt. % in water) was added under continuous stirring, followed by 7.5 grams of Genapol™LA070S.

Figure 1:
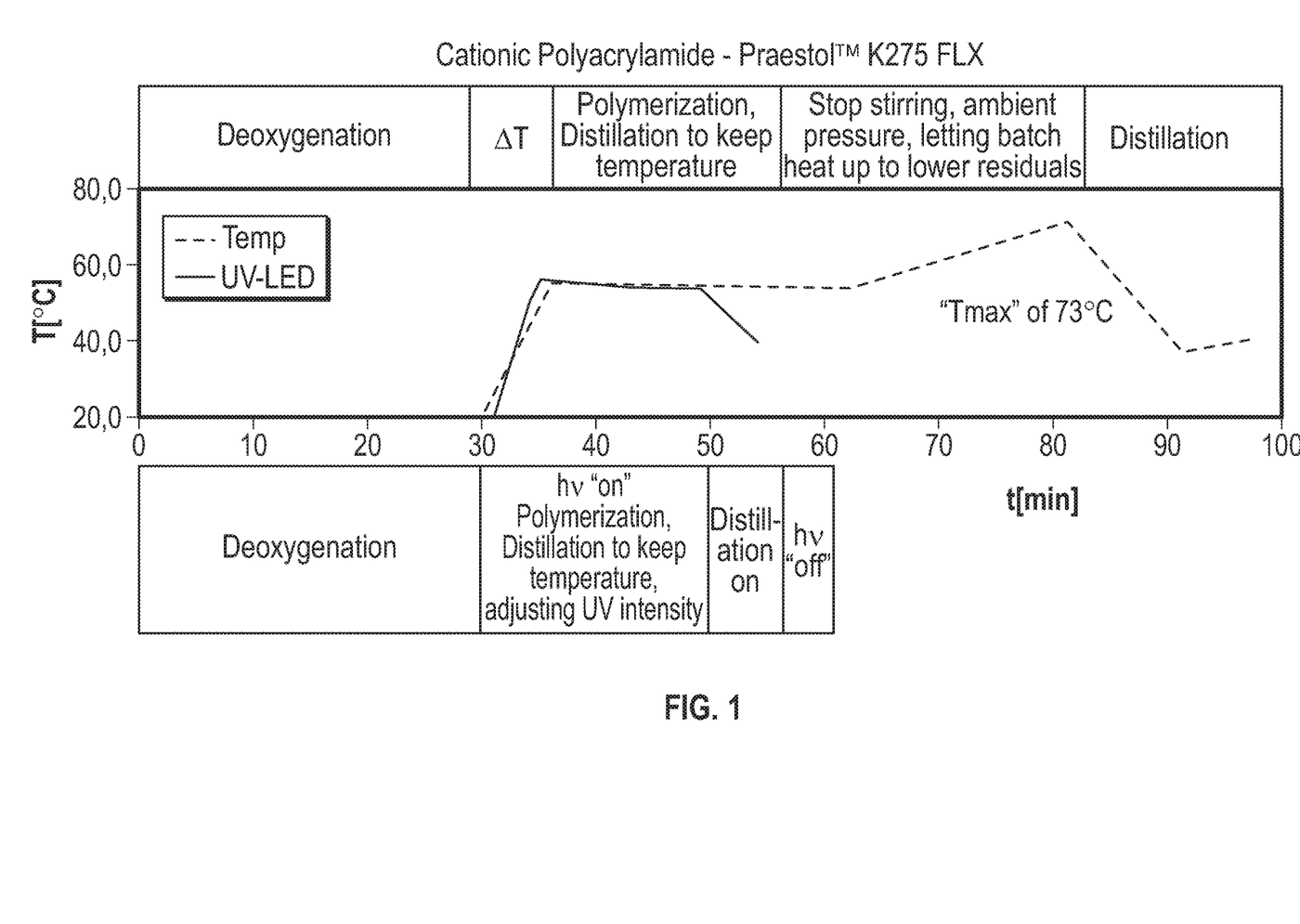
FIG. 1—Temperature profile comparison of laboratory batch production of a standard temperature and UV-LED induced cationic inverse emulsion polymer.

Table 1 and FIG. 1, show the temperature profile comparison of a laboratory batch production of standard temperature and UV-LED induced anionic inverse emulsion polymer Praestol™K275 FLX. FIG. 1 indicates each individual production step, showing time savings of UV-LED induced polymerization.

Example 2—Cationic Acrylic Acid Derivate Polyelectrolyte Using a Photosensitive Only Initiator The product of Example 2 was prepared as described in Example 1, except for the thermosensitive initiator and the following exceptions described below.

A UV LED module with 365 nm LEDs and 3.5 W, was placed beside the glass reactor, at the same height as the emulsion. Other variations can have a UV-lance placed beneath the emulsion surface inside the glass reactor, or a UV-source can be placed inside the reactor in/on/behind its upper shell.

A 2.6 gram solution of DMPA (2,2-Dimethoxy-2-phenylacetophenone, 1 wt. % in Shellsol™D80), was purged for 30 min with nitrogen and added to the deoxygenized water-in-oil emulsion under continuous stirring.

The UV intensity was adjusted so that the emulsion temperature increased to between about 53° C. and 57° C. The initial intensity at the glass reactor outer wall was started with 2.85 mW/cm$^2$ and changed to 0.17 mW/cm$^2$ during the reaction. Because of different UV geometries, power, placement and initiator amounts, the intensities needed can be different from those of this particular product. The temperature was held between 53° C. and 57° C. and after 30 mL of distillate was collected, an additional amount of 2.6 grams DMPA (1 wt. % in Shellsol™D80) solution was added to the emulsion wherein the UV-LED intensity was increased to between 1 mW/cm$^2$ and 2.85 mW/cm$^2$.

After another 60 mL of distillate was collected the UV-LED intensity was raised in two-minute intervals to 2.85 mW/cm$^2$, 9.7 mW/cm$^2$, and 16.1 mW/cm$^2$ at which time the UV-LED intensity was held between 16.1 mW/cm$^2$ and 23 mW/cm$^2$ for from about 2 to 5 minutes and the emulsion was cooled down to 40° C. under constant UV irradiation. It should be noted that the amounts of distillate may vary when using other formulations, initiator amounts, UV intensity, etc.

Once the temperature reached 40° C., the UV irradiation was stopped, and 5 grams of sodium peroxodisulfate solution (25 wt. % in water) and 9.4 grams of a sodium metabisulfite solution (25 wt. % in water) was added under continuous stirring to the emulsion, followed by 7.5 grams of Genapol™LA070S (ethoxylated fatty alcohol surfactant).

Table 1 and FIG. 1, show the temperature profile comparison of a laboratory batch production of standard temperature and UV-LED induced anionic inverse emulsion polymer Praestol™K275 FLX (cationic inverse emulsion polymer), showing time savings of the UV-LED induced polymerization.

TABLE 1 temperature profile comparison of laboratory batch production of standard temperature and UV-LED induced cationic inverse emulsion polymer Praestol ™K275 FLX.
Cationic Polyacrylamide - Praestol ™K275 FLX

| Temperature Induced | | UV-LED Induced | |
|---|---|---|---|
| Time (minutes) | Temperature (° C.) | Time (minutes) | Temperature (° C.) |
| 0 | 19.7 | 0 | 19.3 |
| 30 | 20.2 | 30 | 19.7 |
| 36 | 56.3 | 31 | 19.8 |
| 39 | 55.7 | 34 | 51.0 |
| 46 | 56.4 | 35 | 57.1 |
| 51 | 56.0 | 36 | 56.9 |
| 56 | 55.7 | 38 | 56.3 |
| 62 | 54.9 | 43 | 55.1 |
| 81 | 72.7 | 46 | 55.4 |
| 91 | 37.3 | 48 | 54.9 |
| 97 | 40.7 | 49 | 54.5 |
| | | 54 | 40.1 |

Figure 2:
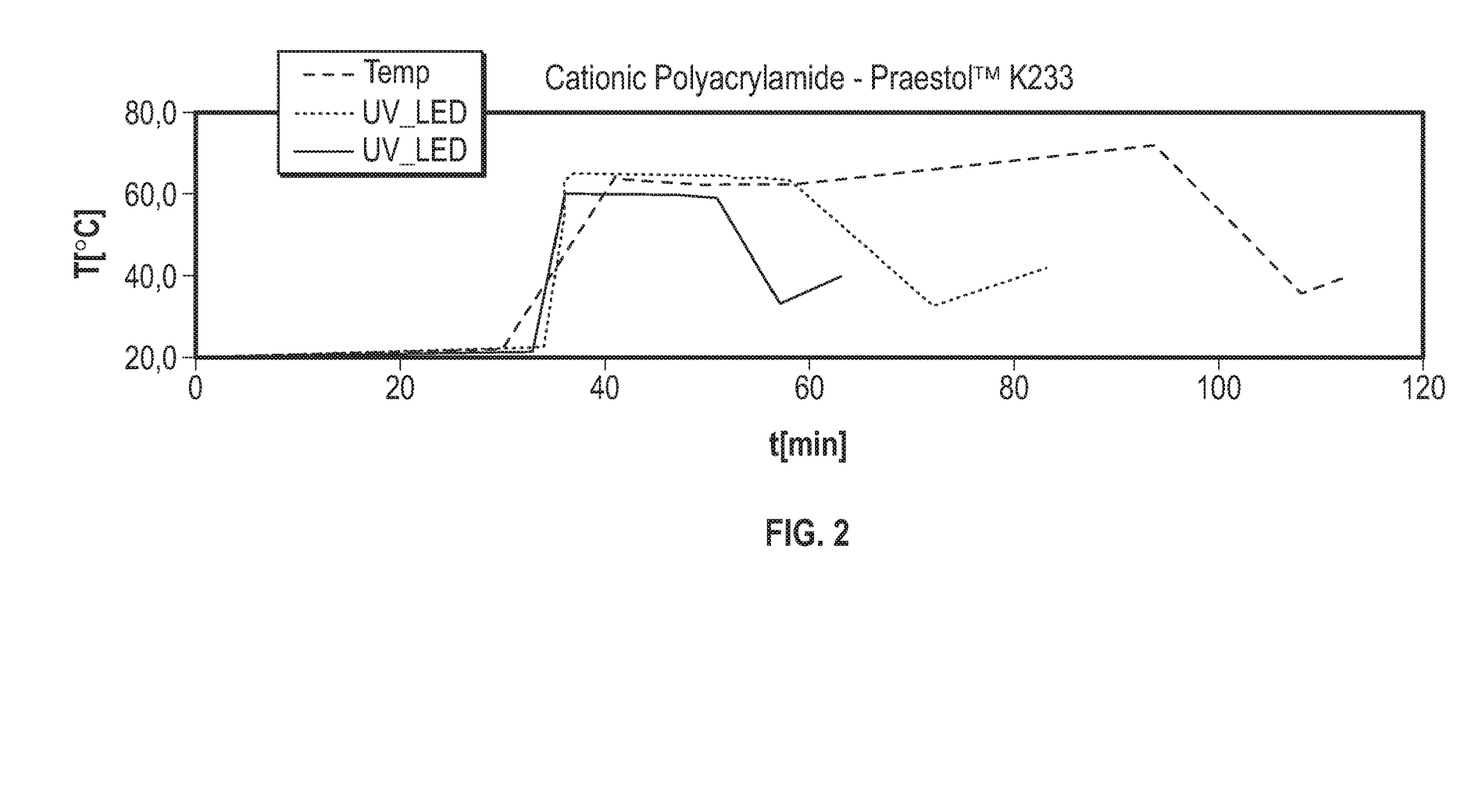
FIG. 2—Temperature profile comparison of laboratory batch production of another standard temperature and UV-LED induced cationic inverse emulsion polymer.

FIG. 2, shows the temperature profile comparison of a different laboratory batch production of standard temperature and UV-LED induced anionic inverse emulsion polymer Praestol™K233 (cationic inverse emulsion polymer), showing time savings of UV-LED induced polymerization.

Example 3—Anionic Acrylic Acid Derivate Polyelectrolyte Using an Only Photosensitive Initiator Example 3, was prepared as described in Example 1, except for the thermosensitive initiator used, the water and oil phase composition, and the following exceptions as noted below.

The water phase comprised 459.8 grams of 43 wt. % aqueous acrylamide solution, 0.61 grams of Trilon®C (10 wt. % solution, diethylenetriaminepentaacetic acid), 100 grams of soft water and 85.9 grams of acrylic acid. The pH was adjusted to 7.9 by adding 147.3 grams of a 32 wt. % solution of sodium hydroxide under constant stirring.

The oil phase was prepared by dissolving 25 grams Zephrym™7053 (polymeric surfactant) and 12 grams Intrasol™FA 1218/5 (ethoxylated fatty alcohol surfactant) into 250 grams of Tetra-n-butane and adding 0.14 grams of DMPA (2,2-Dimethoxy-2-phenylacetophenone) under continuous stirring.

The UV intensity was adjusted so that the water-in-oil emulsion temperature increased to between 53° C. and 57° C., and the emulsion was held at that temperature until 75 mL of distillate was collected at which time the UV-LED intensity was increase in two-minute interval to 2.85 mW/cm$^2$, 9.7 mW/cm$^2$, and 16.1 mW/cm$^2$ at which time the intensity was held between 16.1 mW/cm$^2$ and 23 mW/cm$^2$ for 2-5 minutes. The emulsion was cooled down to 40° C. while under constant UV irradiation.

After 40° C. was reached the UV irradiation was stopped, and 3.8 grams of sodium peroxodisulfate solution (25 wt. % in water) and 17 grams of sodium metabisulfite solution (25 wt. % in water) was added under continuous stirring, followed by 30 grams of Imbentin™C125/060 (ethoxylated fatty alcohol surfactant).

Figure 3:
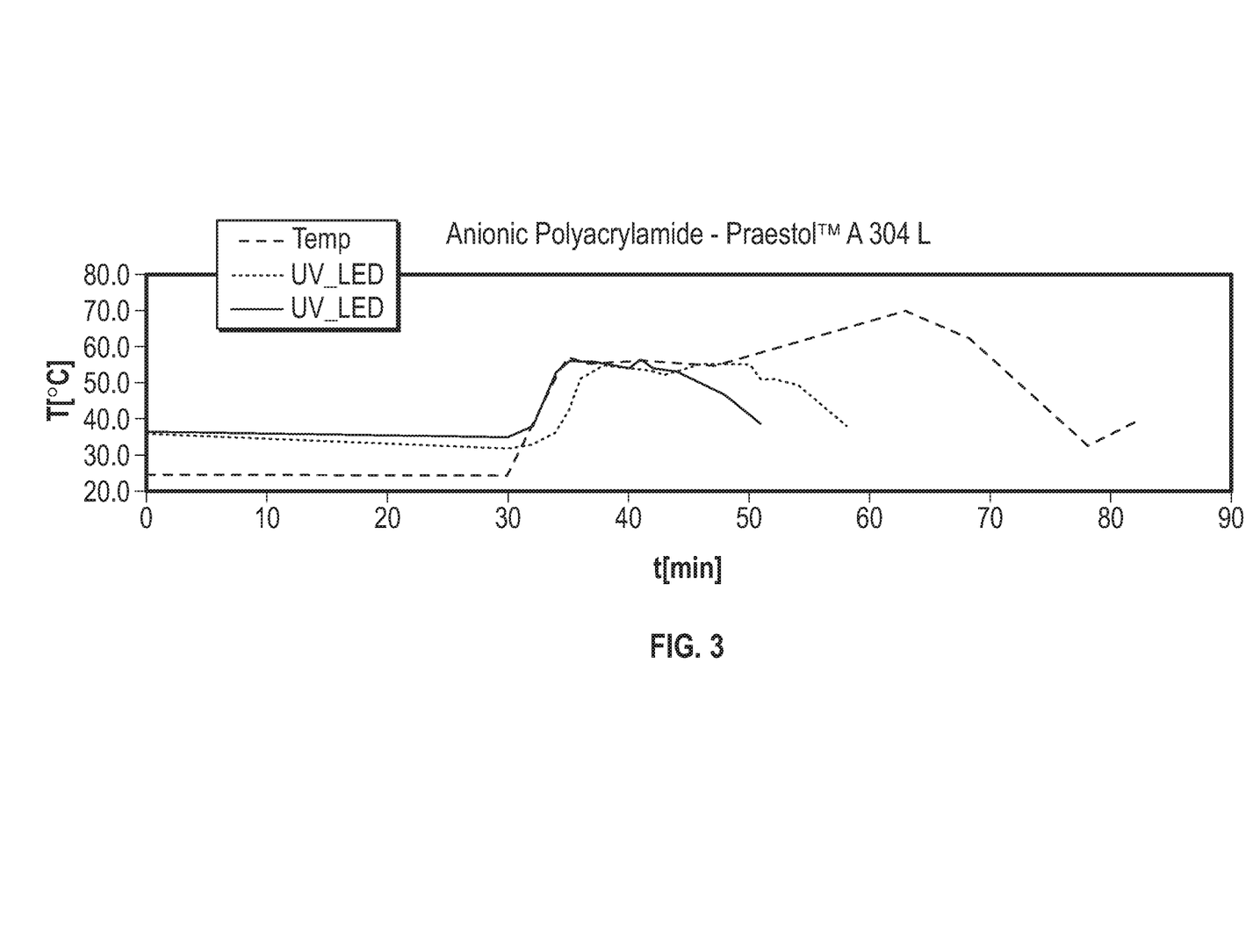
FIG. 3—Temperature profile comparison of laboratory batch production of another standard temperature and UV-LED induced anionic inverse emulsion polymer.

Table 2, FIG. 3, show the temperature profile comparison of a laboratory batch production of standard temperature and UV-LED induced anionic inverse emulsion polymer Praesto™3040 L (anionic inverse emulsion polymer), showing time savings of UV-LED induced polymerization.

TABLE 2

Temperature profile comparison of laboratory batch production of standard temperature and UV-LED induced anionic inverse emulsion polymer Praestol ™A 3040 L.
Anionic Polyacrylamide - Praestol ™3040 L

| Temperature Induced | | UV-LED Induced | | UV-LED Induced | |
|---|---|---|---|---|---|
| Time (minutes) | Temperature (° C.) | Time (minutes) | Temperature (° C.) | Time (minutes) | Temperature (° C.) |
| 0 | 24.4 | 0 | 35.8 | 0 | 36.5 |
| 30 | 24.0 | 26 | 32.1 | 30 | 34.8 |
| 35 | 57.1 | 30 | 31.9 | 32 | 37.7 |
| 36 | 55.1 | 32 | 32.7 | 33 | 43.9 |
| 40 | 56.1 | 34 | 36.1 | 34 | 52.4 |
| 48 | 54.7 | 35 | 41.9 | 35 | 56 |
| 63 | 69.8 | 36 | 50.9 | 36 | 55.8 |
| 68 | 62.8 | 37 | 52.8 | 37 | 55.7 |
| 78 | 32.5 | 38 | 54.8 | 39 | 54.4 |
| 82 | 39.1 | 42 | 53.1 | 40 | 54 |
|  |  | 43 | 52.3 | 41 | 56.3 |
|  |  | 46 | 55 | 42 | 54.1 |
|  |  | 50 | 55 | 44 | 53 |

Figure 4:
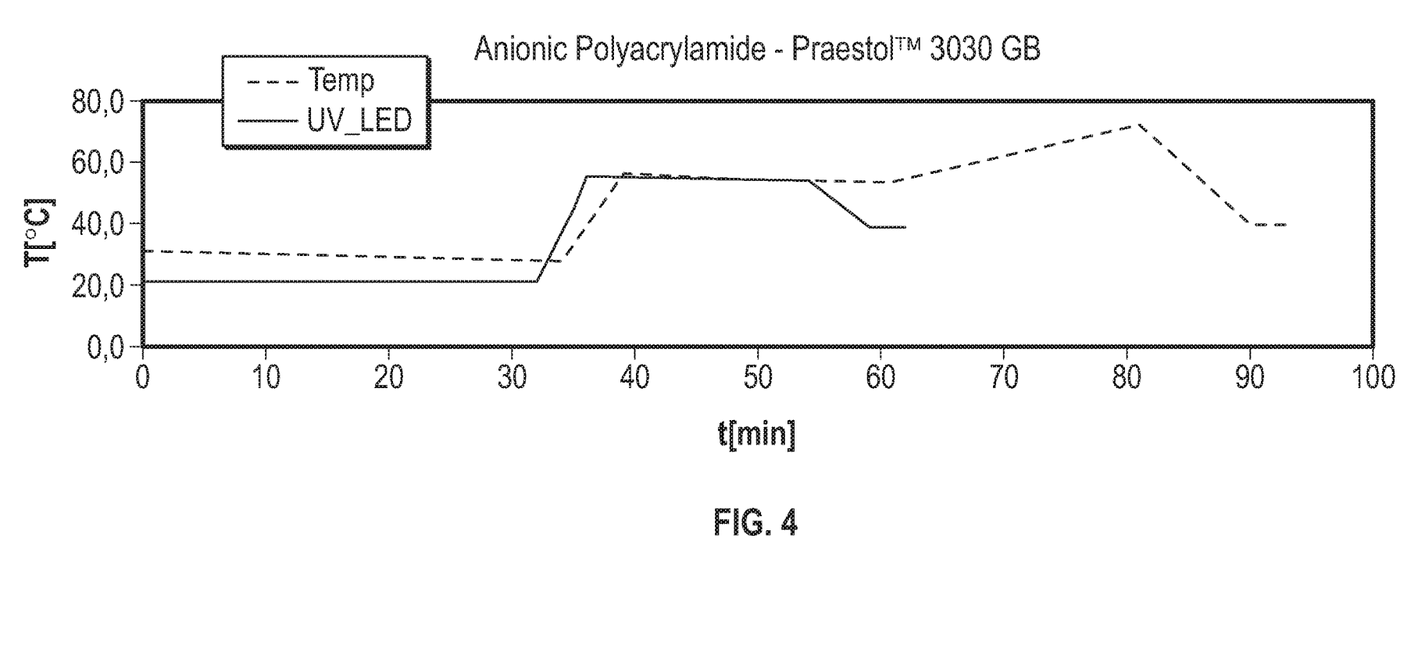
FIG. 4—Temperature profile comparison of laboratory batch production of another standard temperature and UV-LED induced anionic inverse emulsion polymer.

Table 3 and FIG. 4, show the temperature profile comparison of a laboratory batch production of standard temperature and UV-LED induced anionic inverse emulsion polymer Praesto™3030 GB (anionic inverse emulsion polymer), showing time savings of UV-LED induced polymerization.

TABLE 3

Temperature profile comparison of laboratory batch production of standard temperature and UV-LED induced anionic inverse emulsion polymer Praestol ™A 3030 GB
Anionic Polyacrylamide - Praestol ™A 3030 GB

| Temperature Induced | | UV-LED Induced | |
|---|---|---|---|
| 0 | 31.7 | 0 | 21.8 |
| 34 | 28.5 | 30 | 22.0 |
| 39 | 57.0 | 32 | 21.9 |
| 41 | 55.7 | 35 | 45.7 |
| 48 | 54.8 | 36 | 56.3 |
| 56 | 54.7 | 38 | 55.9 |
| 61 | 53.7 | 40 | 55.6 |
| 81 | 72.8 | 43 | 55.4 |
| 90 | 40.0 | 47 | 54.6 |
| 93 | 40.0 | 50 | 55.2 |
|  |  | 52 | 55.1 |
|  |  | 54 | 54.5 |
|  |  | 59 | 39.3 |
|  |  | 62 | 39.2 |

Example 4—Anionic Acrylic Acid Derivate Polyelectrolyte Using a Thermosensitive Initiator The emulsion of Example 4, was prepared as described in Example 1, except for the following noted exceptions.

An oil phase was prepared by mixing 300 grams Exxsol™D100 ULA (aliphatic mineral oil), 18 grams Span™ 80 and 20 grams Hypermer® B246 (polymeric surfactant) and the temperature of the oil phase adjusted to between 35° C. and 40° C.

An aqueous phase was prepared separately which comprised 321 grams of 43 wt. % aqueous acrylamide solution, 145 grams acrylic acid, 190 grams soft water and 1.5 grams of Trilon®C (10 wt. % solution, diethylenetriaminepentaacetic acid). The pH was adjusted to 5.3 using 90.3 grams of a 25 wt. % aqueous ammonium hydroxide solution. The temperature after neutralization was 39° C.

The water phase and oil phase were homogenized and mixed with a 4-blade glass stirrer while being sparged with nitrogen for 30-60 minutes. During the nitrogen sparge, the temperature of the emulsion was adjusted to between about 40° C. and 45° C.

Polymerization was initiated by adding 6.4 grams of lauroyl peroxide (1.5 wt. % in Exxsol™D100 ULA (aliphatic mineral oil), sparged with nitrogen for 30 minutes) and the temperature increased to about 60° C. and held there for 40 minutes at which time the stirring was stopped and the vacuum was set to ambient pressure under nitrogen.

After the temperature reached a plateau, the emulsion was cooled down under continuous stirring to a temperature of 40° C. at which time 20 grams of a 25 wt. % aqueous solution of ammonium hydroxide, 12 grams of a sodium metabisulfite solution (25 wt. % in water), 15 grams of Cirrasol™G 1086 (nonionic polymeric surfactant), 5 grams of Tetronic™1301 (ethoxylated fatty alcohol surfactant) and 5 grams of Synperonic™AB 6 (ethoxylated fatty alcohol surfactant) was added under continuous stirring.

Figure 5:
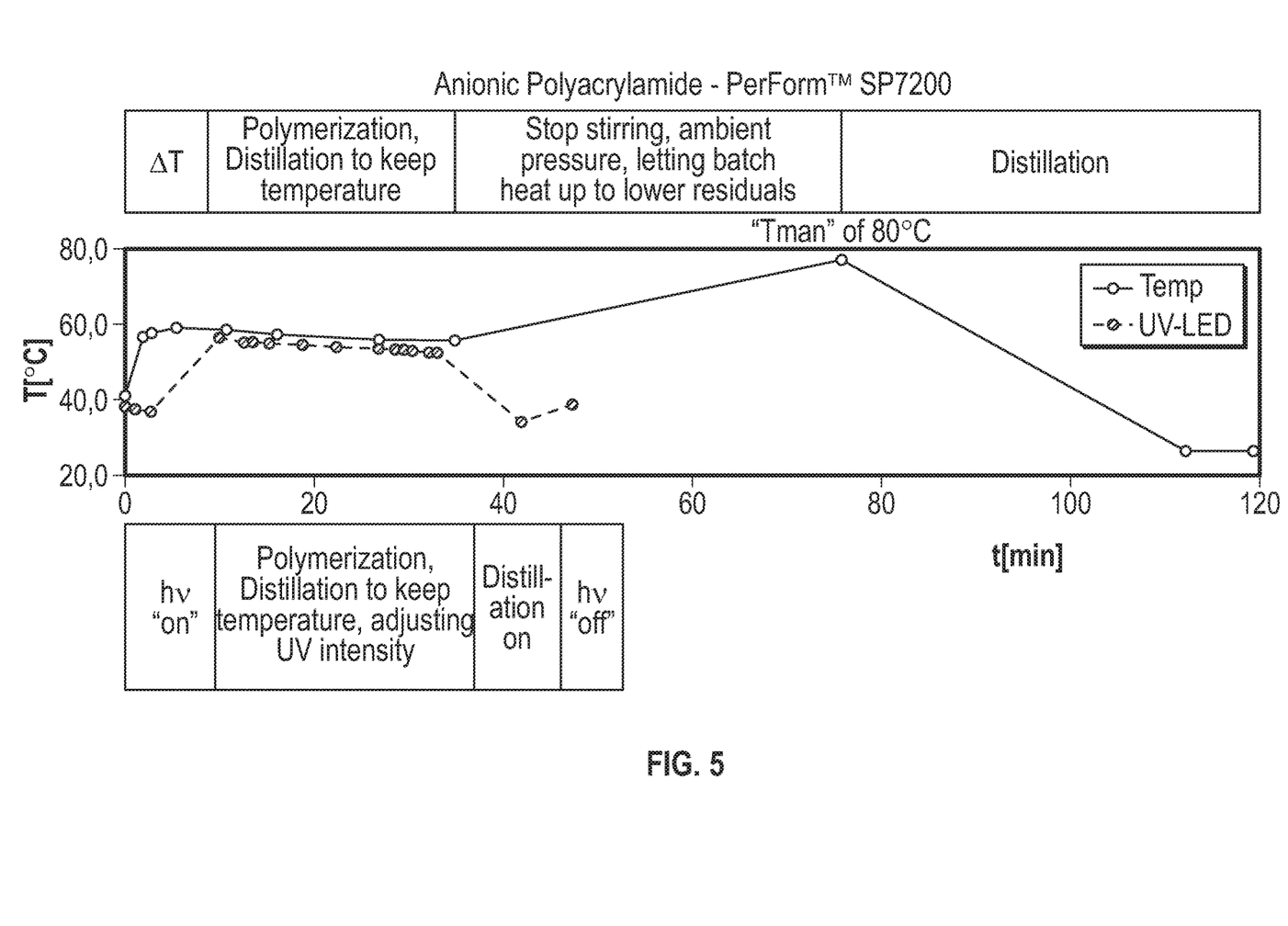
FIG. 5—Temperature profile comparison of laboratory batch production of another standard temperature and UV-LED induced anionic invers emulsion polymer.

Table 4 and FIG. 5, show the temperature profile comparison of laboratory batch production of standard temperature and UV-LED induced cationic inverse emulsion polymer PerForm™SP7200 (anionic inverse emulsion polymer), showing time savings of UV-LED induced polymerization, while Table 5 shows the properties of the produced product.

Example 5—Anionic Acrylic Acid Derivate Polyelectrolyte Using a Photosensitive Initiator Example 5, was prepared as described in Example 4, except for the thermosensitive initiator. Also, the UV-LED assisted photopolymerization as described in example 3 was used. In the current example, 3.5 grams of DMPA solution (0.1 wt. % in Exxsol™D100 ULA (aliphatic mineral oil), sparged with nitrogen for 30 minutes) was added to the emulsion after deoxygenation, followed by a second amount of 3.5 grams of DMPA solution after 25 minutes and followed by a third amount of 3.5 grams of DMPA solution after 10 minutes. The UV-LED intensity was constantly adjusted to keep the reaction temperature between 55° C. and 60° C.

It should be noted that the preceding UV polymerizations can be accomplished at distillation temperatures of 45° C., 50° C., 55° C., 65° C., etc. The temperature profile largely is dependent on the UV intensity and the vacuum/distillation which takes heat/energy out of the system.

Table 4 and FIG. 5, shows the properties of the polymer PerForm™SP7200 produced by inverse emulsion polymerization using the standard, thermally induced inverse emulsion reaction, and products made using the current photo-initiated technology. The photo-initiated reaction was initiated with a standard Osram UV lamp (Philips Cleo Performance 40 W) and an UV-LED device having 4 diodes at 365 nm and 3.5 W, showing time savings of UV-LED induced polymerization, while Table 5 shows the properties of the produced product.

TABLE 4

Temperature Profile of Perform ™SP7200
Anionic Polyacrylamide - Perform ™SP7200

| Temperature Induced | | Temperature Induced | |
|---|---|---|---|
| Time (minutes) | Temperature (° C.) | Time (Minutes) | Temperature (° C.) |
| 0 | 43.2 | 0 | 39.8 |
| 2 | 60.0 | 1 | 39.5 |
| 3 | 61.2 | 3 | 38.7 |
| 6 | 62.5 | 11 | 59.7 |
| 12 | 61.9 | 14 | 58.6 |
| 18 | 60.4 | 15 | 58.4 |
| 30 | 58.9 | 17 | 58.1 |
| 39 | 58.9 | 21 | 57.7 |
| 85 | 81.6 | 25 | 56.8 |
| 126 | 27.0 | 30 | 56.7 |
| 134 | 28.1 | 32 | 56.2 |
| | | 33 | 56.1 |
| | | 34 | 55.8 |
| | | 36 | 55.4 |
| | | 37 | 55.2 |
| | | 47 | 35.8 |
| | | 53 | 40.3 |

TABLE 5

Properties of Produced Polymer Perform ™SP7200

| | Product viscosity [cps] | Solution viscosity [cps] | Salt viscosity [cps] | Yield Stress | Shear Modulus | Residual AAm/AA [%] |
|---|---|---|---|---|---|---|
| Thermal Induced | 288 | 9200 | 222 | >100 | 228 | <200/<1000* |
| UV-LED Induced | 560 | 10340 | 380 | >100 | 193 | <20/90 |
| UV Induced | 968 | 11080 | 438 | >100 | 219 | <20/35 |

*Perform ® SP7200 specification

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the disclosure as set forth in the appended claims and their legal equivalents.

What is claimed is:

1. A method of producing a polymerized product through an inverse emulsion polymerization reaction, the method comprising:
    introducing an ultraviolet (UV) light sensitive initiator into an inverse emulsion monomer formulation comprising monomers;
    irradiating the monomer formulation with an UV light source at a predetermined intensity;
    adjusting the UV light source intensity so that the reaction reaches a first predetermined temperature;
    increasing the UV light source intensity until the temperature of the reaction reaches a plateau;
    cooling the emulsion to a second predetermined temperature under constant irradiation; and
    wherein the polymerized product is formed from polymerization of the monomers in the presence of the irradiated UV light sensitive initiator.

2. The method according to claim 1, further comprising additional initiators selected from the group of redox initiators, thermal initiators, photo initiators, and combinations thereof.

3. The method according to claim 1, wherein the UV light sensitive initiator is selected from an azo compound having the functional group R—N=N—R$^1$, wherein R and R$^1$ is an aryl and/or alkyl, azobisisobutyronitrile, 2,2'-azobis[2-(2-imidazolin-2-yl)propane]dihydrochloride, 2,2'-azobis(2,4-dimethylvaleronitrile), benzoyl peroxide, 2,2-dimethoxy-2-phenylacetophenone (DMPA), 2,4,6-trimethylbenzoylphenyl phosphinate and combinations thereof.

4. The method according to claim 1, wherein the UV light sensitive initiator has an absorption band width of from about 280 nm to about 420 nm.

5. The method according to claim 4, wherein the light sensitive initiator has an absorption band width of from about 320 nm to about 400 nm.

6. The method according to claim 1, wherein the intensity of the UV light is in the range of from about 0.15 mW/cm$^2$ to about 100 mW/cm$^2$.

7. The method according to claim 6, wherein the intensity of the UV light source is from about 2 mW/cm$^2$ to about 50 mW/cm$^2$.

8. The method according to claim 7, wherein the intensity of the UV light source is from about 2.85 mW/cm$^2$ to about 23.0 mW/cm$^2$.

9. The method according to claim 1, wherein the UV light source is located outside of the reaction vessel.

10. The method according to claim 1, wherein the UV light source is located within the reaction vessel.

11. The method according to claim 1, wherein the UV light source is selected from the group of an UV-LED, a fluorescent lamp, a mercury-vapor lamp or any other type of UV light emitting source and combinations thereof.

12. The method according to claim 1, wherein the UV light source is an LED light source.

13. The method according to claim 1, wherein the temperature of the monomer formulation of the inverse emulsion reaction that the ultraviolet (UV) light sensitive initiator is introduced into is from about 0° C. to about 100° C.

14. The method according to claim 13, temperature of the monomer formulation of the inverse emulsion reaction that the ultraviolet (UV) light sensitive initiator is introduced into is from about 20° C. to about 80° C.

15. A product made according to the method of claim 1.

16. The method according to claim 1, wherein the UV light source intensity is increased at time intervals until a drop in temperature takes place in the reaction.

17. The method according to claim 16, wherein the UV light source intensity is maintained after the drop in temperature until the reaction reaches a predetermined temperature.

* * * * *